April 26, 1966  B. W. HUTCHINGS  3,247,651
INERTIA-TYPE SOLIDS DE-ENTRAINMENT DEVICE
Filed Nov. 27, 1962
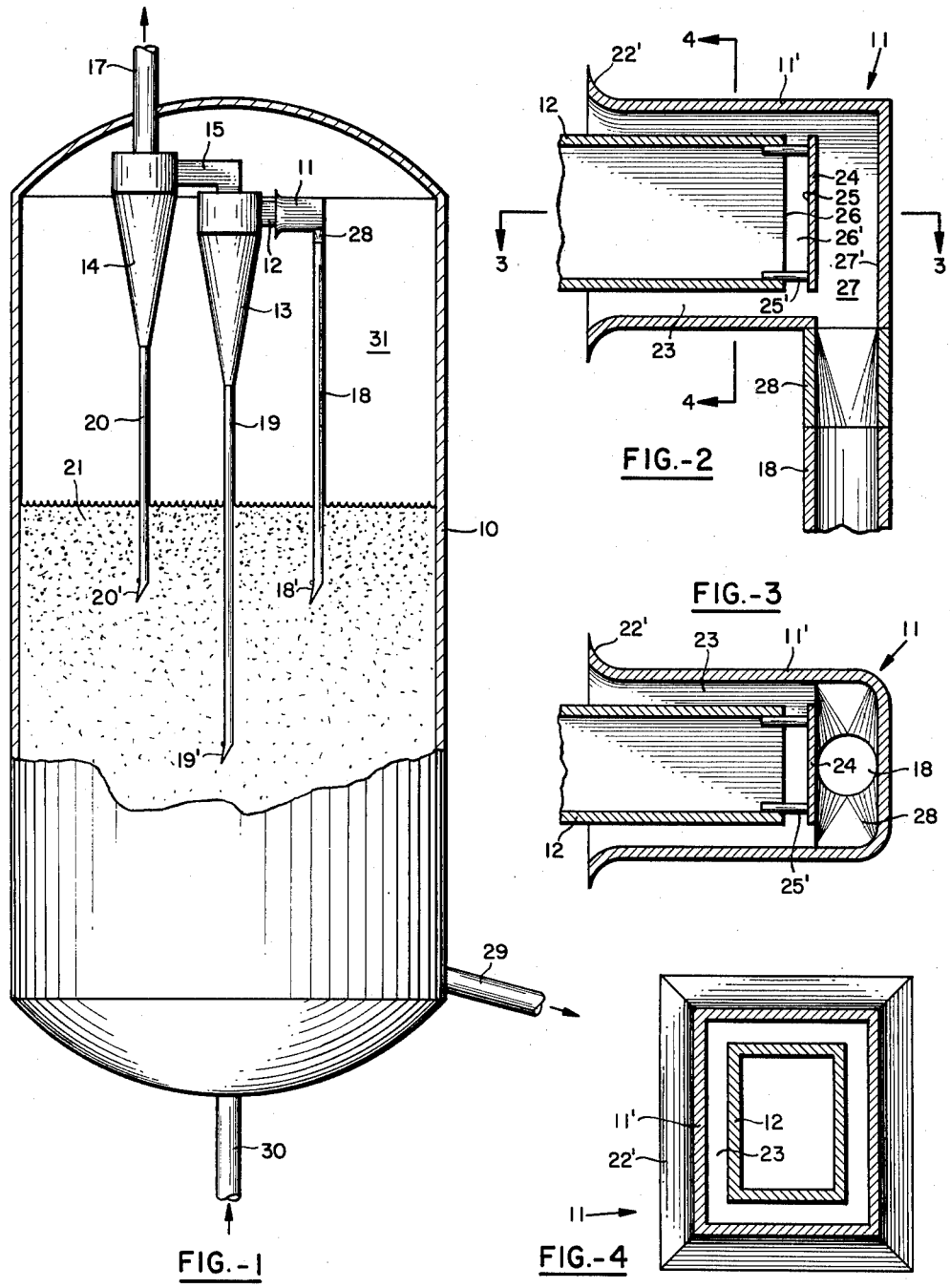
Barry W. Hutchings  Inventor
By *George J. Silbaugh*
Patent Attorney

United States Patent Office 3,247,651
Patented Apr. 26, 1966

3,247,651
INERTIA-TYPE SOLIDS DE-ENTRAINMENT DEVICE
Barry W. Hutchings, Chatham, N.J., assignor to Esso Research and Engineering Company, a corporation of Delaware
Filed Nov. 27, 1962, Ser. No. 240,389
8 Claims. (Cl. 55—345)

This invention relates to an apparatus for the separation of solids from gases in which they have become entrained. More particularly, it relates to the gross separation of solids from a gas in which they are entrained before the gaseous-solid mixture enters one or more cyclone separators for a more complete recovery of the entrained solids.

The commercial fluid catalytic cracking process requires the use of great amounts of catalyst in finely divided form; this catalyst is continually circulated between a reactor and a regenerator. It is well known in the art to recover this catalyst by means of standard type cyclone separators. The gaseous-solid mixture is introduced into the cyclone as a cylindrical helix and is whirled with great velocity. The gas path takes the form of a double vortex; the gas spirals downwardly on the outside of a gas outlet pipe and then proceeds upwardly on the inside of the gas outlet pipe and is subsequently removed at the top of the cyclone separator. Solids are thrown by centrifugal force to the wall of the cyclone separator and are subsequently removed from the bottom of the cyclone separator. Traditionally cyclone separators are used in series to effectuate almost a complete recovery of the entrained solids.

Experiments have indicated that cyclone separation efficiency is greater for cyclones of smaller diameter. However, the use of cyclone separators of smaller diameter minimizes the amount of catalyst that each cyclone separator is capable of separating and consequently additional cyclone separators must be added, at great expense, to the series. In addition to this problem, several other prominent shortcomings have been associated with the use of cyclone separators. The process was not accomplished expediently. Often it is of paramount importance to rapidly return large quantities of catalyst to the reaction zone; ordinary cyclone separators do not operate with sufficient rapidity.

Furthermore, cyclone separators have traditionally had comparatively short life spans and were often in a state of disrepair. This was caused, for the most part, by the effects of large volumes of solid catalytic material eroding the body of the cyclone separator. The catalytic material is often rough in texture and since it is being whirled with great velocity it strikes the walls of the cyclone separator with damaging effect, particularly in the case of the primary cyclone separator which is subjected to the largest bulk of solid material.

Another problem concerning the state of repair of the cyclone separator has been the nonuniform flow of particles. Sporadic flow of solid material has caused clogging and malfunctioning of the cyclone separators.

Attempts have been made to solve these problems by means of a preliminary gross separation of solid material. Often this initial separation would involve expensive elaborate devices. The main problem faced by earlier separation efforts has been a failure to effect a permanent separation of particles and gases. Although the particles are separated from the gaseous material, there is a tendency for this separation to be only temporary; the effects of striking a wall, loss of momentum or gravity will cause much of the material to return to the gaseous stream.

Fine catalytic or contact material, in the range of 0–40 microns, has presented another difficulty in effective solid-gas separation. The recovery of this fine material from the cyclone separator has been highly inefficient and a large quantity of valuable material is constantly being lost.

It is an object of this invention to provide a more efficient means for the separation of solid contact material, catalytic in particular, from the gaseous product in which they are entrained.

It is a further object of this invention to provide means for the preliminary separation of solid catalytic or contact material which will improve the life span and operating efficiency of cyclone separators.

It is a still further object of this invention to provide means for the permanent separation of a large part of solid catalyst particles which are entrained in a gaseous stream.

It is a still further object of this invention to provide an effective means for recovering catalytic or contact material of 1–40 micron diameter.

According to this invention, an open-ended flared shell or de-entrainment device is fitted over the extended inlet of a primary cyclone separator and in spaced relation thereto. The inlet and the shell are rectangular in vertical cross section and this forms a rectangular space between the shell and the inlet. A baffle of substantially the same shape and area as the opening of the inlet is maintained in spaced and parallel relation to the opening of the inlet. The baffle and the inlet are concentric. A gaseous solids suspension enters the shell and is channeled into the space between the shell and the extended inlet. The stream on the outside of the cyclone inlet flows in a direction opposite that of the stream flowing inside the extended cyclone inlet. The area of the rectangular space is somewhat larger than that of the cyclone inlet so that the velocity of the mixture in the outside zone is somewhat less than the velocity of the mixture in the cyclone inlet.

At the extreme outer end of the extended cyclone separator inlet, the gas portion of the mixture is forced to enter the cyclone separator inlet after making a 180° change in direction. The solids portion of the suspension, by virtue of its high inertia, flows beyond the opening into the cyclone separator and the baffle having the same dimensions as the cyclone separator inlet acts as a partition between a solids collecting space behind the baffle into which the high inertia solids are channeled and the extended cyclone separator inlet. The baffle being spaced from the inlet also forms the opening through which the gas and a small amount of solid make the 180° turn. In this manner, solids in the gaseous material, going to the primary cyclone separator, have been reduced up to 60% before passing through the primary cyclone separator. Additionally, a particularly large quantity of fine 1–40 micron material is recovered in the solids collecting area.

Other objects and advantages of the present invention will become apparent to those skilled in the art as the description thereof proceeds.

In the drawings:

FIG. 1 represents a front elevation partly in cross section of a vessel containing two cyclone separators and the de-entrainment device of this invention;

FIG. 2 represents an enlarged vertical section of the upper end of the de-entrainment device and a portion of the cyclone separator inlet;

FIG. 3 represents an enlarged cross section taken substantially along line 3—3 of FIG. 2; and FIG. 4 represents a cross section taken substantially along line 4—4 of FIG. 2.

Referring now to FIG. 1, the reference character 10 designates a vessel adapted to contain finely divided solids and provided with a de-entrainment device 11 which fits over the extended inlet 12 of primary cyclone separator 13. The outlet of primary cyclone separator 13 is connected with the secondary cyclone separator 14 by means of gas outlet line 15. The secondary cyclone separator 14 has a vertically arranged gas outlet pipe 17 which extends through the top of vessel 10. De-entrainment device 11 and cyclone separators 13 and 14 are provided with diplegs 18, 19 and 20, respectively, which serve to collect the solid material separated in the solids separating means 11, 13 and 14 to convey it below the surface of the fluidized bed 21 of solids in vessel 10. The diplegs 18, 19 and 20 are provided with trickle valves or the like 18', 19' and 20', respectively. Solids are removed from fluid bed 21 and from vessel 10 by means of outlet 22.

Gaseous material to be treated or converted is introduced into the bottom of vessel 10 through line 30 and passes up through bed of solids 21 at a velocity to fluidize the solids therein. Gaseous material leaving the upper surface of bed 21 contains entrained solids and this gaseous solid mixture or suspension enters dilute phase 31 above the fluidized bed 21. Finely divided solids are introduced into vessel 10 along with the gas passing through line 30; or solids may be separately introduced into fluidized bed 21 through a separate line or lines (not shown). The gaseous-solid suspension from dilute phase 31 enters de-entrainment device 11 where a gross separation of solids or catalytic material takes place. Up to 60% of the suspended solids is separated from the gas and transferred to bed 21 through dipleg 18.

The gaseous stream then continues into primary cyclone separator 13 through extended cyclone inlet 12 at which time more solid material is separated and is passed through dipleg 19 into solids bed 21. Finally, the gaseous solid mixture passes through line 15 into secondary cyclone separator 14 where substantially all of the remaining solids are removed and passed through dipleg 20 to bed 21. The "clean" or converted gaseous material is recovered through outlet 17 and catalytic material is recirculated to the other reaction vessel (not shown) by means of outlet pipe 29.

Referring now to FIGS. 2, 3 and 4, the de-entrainment device 11 comprises an open-ended shell 11' rectangular in vertical cross section and having each vertical wall of a greater length than each horizontal wall as shown in FIG. 4. The open end of shell 11' has an outwardly flared edge 22'. The shell 11' is of larger dimension than cyclone separator inlet 12 and is fitted over inlet 12 in spaced and concentric relation as shown in FIGS. 2, 3 and 4. The shell overlaps the inlet 12 so that the inlet 12 is maintained in spaced relation with the shell 11' to provide rectangular passageway 23 between the inlet 12 and shell 11'.

A two-faced baffle 24 is secured to inlet 12 and supported by two or more straps 25' in a position so that one face 25 is directly opposite the opening 26 of the cyclone separator inlet 12 and in spaced relation thereto to form space 26'. The baffle is substantially flat, rectangular and has approximately the same shape as inlet 12 and the same surface as the opening 26 in the inlet 12. A solids collecting chamber 27 is provided between the opposite face of the baffle 24 and the back enclosing wall 27' of de-entrainment device 11. A funnel-shaped transition piece 28 extends down from the solids collecting chamber 27 which is substantially rectangular in horizontal cross section as shown in FIG. 3. The tubular dipleg 18 which is circular in horizontal cross section extends down from the transition piece 28.

The gaseous-solids suspension or mixture is directed into the de-entrainment device 11 by means of flared edge 22' on shell 11' and travels horizontally along the outside of extended inlet 12 and through space 23 between inlet 12 and the spaced and surrounding shell 11' of de-entrainment device 11. The gaseous component and a small part of the entrained solids pass into the vicinity of the baffle 24 and make a 180° change of direction through space 26'. The great majority of the solid material, up to about 60%, continues forward past baffle 24 and into solids collecting chamber 27. This separation is caused by the great difference in the amount of inertia generated by gases and solids. The inertia of the solids is much greater and will tend to keep the solids in motion along their original path after the gaseous component or element is passed through the 180° angle and strikes the inner face of baffle 24 which is spaced from the end of inlet 12.

The gaseous element is rechanneled by the inner face of baffle 24 and is forced to enter the extended primary cyclone separator inlet 12. After the separation, the separated solids or solid material is prevented from reentering cyclone separator inlet 12 by the other or rear side of baffle 24 and the separated solids continue down the length of the solids collecting chamber 27. The separated solids pass down through the funnel-shaped transition piece 28 and into the tubular dipleg 18 and then are passed back to the solids bed 21 in the reaction zone 10 as illustrated in FIG. 1.

The gaseous component still contains entrained solids and is passed through primary cyclone separator 13, then through gas outlet line 15 to secondary cyclone separator 14 and then out through gas outlet line or pipe 17. Additional separation of solids occurs in cyclone separators 13 and 14 and these solids are returned to the fluid bed 21 through diplegs 19 and 20.

In a specific example in a fluid catalytic cracking process the finely divided solids comprise silica-alumina catalyst having about 25% alumina. The solid particles range in size from less than about one to about 200 microns with about 95% in the 20 to 80 micron range. In one case the solids had the following size distribution by weight:

| Microns: | Weight percent |
|---|---|
| 0–20 | 0.4 |
| 20–40 | 12.4 |
| 40–86 | 85.0 |
| 86–111 | 1.2 |
| 111+ | 1.0 |

During cracking, the temperature is about 950° F. and coke is laid down on the catalyst. For cracking about 14,000 barrels of gas oil per day and regenerating the catalyst in a regenerator, about 7000 lbs. per hour of coke are burned from the catalyst and the combustion gases leaving the bed in the regenerator will contain entrained catalyst particles. The vessel 10 may be considered a regenerator. The rate of circulation of catalyst between the reactor (not shown) and regenerator 10 is about 10 tons per minute. The catalyst holdup in the reactor is about 40 tons. The regenerator is provided with 7 sets of two-stage #40 Buell cyclones. The temperature during regeneration is about 1140° F.

Air and spent coke-containing catalyst are introduced into regenerator 10 through line 23 and the superficial velocity of the gases passing up through fluid bed 21 is about 2.4 feet per second. The combustion gases passing into the dilute phase above the level of the fluid bed 21 contain about 0.5 lb. per cubic foot of catalyst.

In the following examples the first case covers the conventional cyclone separation and the second case covers the use of the de-entrainment device of the present invention.

In the first case, the regenerator 10 is 20 feet in diameter and has a straight side wall of 40 feet in length. Each primary cyclone separator has an inlet area of about 1.63 ft.$^2$, the inlet being rectangular with each vertical side being about 23 inches and each horizontal side being about 10 inches. The inlet velocity of the gaseous suspension to the primary cyclone separator is about 60 ft./sec. and the catalyst loading in the suspension is about 0.5 lb./ft.$^3$. With the 7 sets of Buell cyclones the total loss of catalyst is 2.35 tons per day and of this amount about 1.5 tons per day represent fine catalyst below 40 microns in size.

In the second case the operating conditions and apparatus are the same as in the first case with the exception that the primary cyclone separator has an extended inlet 12 and the de-entrainment device of the present invention is used. The de-entrainment device is rectangular with each vertical side being about 35 inches and each horizontal side being about 22 inches. The de-entrainment device is placed over the extended inlet 12 of the primary cyclone separator 13 as shown in FIGS. 1 and 2. The rectangular shell 11' of the de-entrainment device 11 is larger than inlet 12 and is maintained or spaced by space 23 a distance of about 4 inches away from the rectangular wall of the inlet 12. This distance may be between about 1¼ and 4¼ inches. The baffle 24 is maintained about 3 inches away from the end wall of the inlet 12 and this distance may be between 1¼ and 4¼ inches. The shell 11' of the de-entrainment device 11 is about 35 inches long from flared end 22' to the rear wall of the collecting chamber 27. The extended inlet 12 of the primary cyclone separator 13 extends about 14 inches into the shell 11'.

In this operation the loss of finely divided catalyst is reduced to 1.26 tons/day of which about 0.9 ton/day is finely divided catalyst below about 40 microns in size.

With the de-entrainment device used on all the sets of cyclone separators the overall loss of catalyst is reduced 46% and in respect to 0-40 micron material the loss is reduced 40%.

The demonstrated ability of the entrainment separator to hold fines was unexpected, particularly in the 0-20 micron fraction. It is believed that this ability to recover fines is connected with an entrapment phenomenon. The catalyst or solids density at the point of separation is high enough so that the very fine particles are forced to take a tortuous path in leaving with the gaseous material. The residence time of the solids mixture in the separation zone is apparently insufficient for many of these particles to take such a tortuous path and consequently they are carried along with the coarser particles.

Thus, several obvious advantages of this invention are apparent. Primarily more valuable catalytic material is recovered. Cyclone separators are subjected to considerably less erosion since they are exposed to substantially less solid material and this is especially applicable to the primary cyclone separator. Furthermore, the cyclone separators are subjected to fewer mechanical failures in light of the reduced solid load to which they are exposed.

What is claimed is:

1. An apparatus for separating entrained solids from a gaseous stream in which they are entrained which includes a hollow substantially rectangular-shaped shell conduit having a closed end and an open end, said open end of said shell conduit being flared outwardly, said shell conduit having a larger internal cross sectional area than the external cross sectional area of a hollow extended rectangular cyclone separator inlet conduit and arranged in spaced apart relation to said extended rectangular cyclone separator inlet conduit, said cyclone inlet conduit extending into and concentric with said shell conduit, said cyclone inlet conduit terminating adjacent to and in close proximity to said closed end of said shell conduit, said separator inlet conduit being substantially parallel to and spaced apart from said shell conduit to form a continuous passageway therebetween and extending from the flared open end of said shell conduit to beyond the end of said cyclone separator inlet conduit, a two-faced baffle in said shell conduit but external to said cyclone separator inlet conduit and located between said cyclone separator inlet conduit and the closed end of said shell conduit, each face of said baffle having a surface area approximately equal in area to the internal cross sectional area of said cyclone separator inlet conduit and concentric therewith, one face of said baffle being maintained substantially parallel to and spaced apart from the said cyclone separator inlet conduit, means to connect said baffle to said cyclone separator inlet conduit, the other face of said baffle being spaced apart from the closed end of said shell conduit, a solids collecting chamber formed within said shell conduit between the other face of said baffle and said closed end of said shell conduit, means for removing separated solids from said collecting chamber including a dipleg, said dipleg extending at a right angle to said shell conduit and being continuous with said collecting means.

2. An apparatus according to claim 1 wherein said cyclone separator extended inlet conduit is spaced at a distance of between 1¼ and 4¼ inches from the internal wall of said shell conduit and said baffle is spaced at a distance of between 1¼ and 4¼ inches from the end of said extended cyclone separator conduit.

3. An apparatus for separating entrained solids from a gaseous stream which includes a hollow shell conduit having a closed end and an open end, said shell conduit having a larger internal cross sectional area than the external cross sectional area of a hollow extended cyclone separator inlet conduit and arranged in spaced apart relation to said extended cyclone separator inlet conduit, said cyclone separator inlet conduit extending into and concentric with said shell conduit and terminating adjacent to and in close proximity to said closed end of said shell conduit, said inlet conduit being arranged in a spaced apart relation and substantially parallel to and inwardly from said shell conduit to form a continuous passageway therebetween and extending from the open end of said shell conduit beyond the end of said cyclone separator inlet conduit, a two-faced baffle in said hollow shell conduit but external to said inlet conduit and located between said inlet conduit and said closed end of said shell conduit, means to maintain said baffle in spaced relation to the end of said cyclone separator inlet conduit, each face of said baffle being approximately equal in surface area to the internal cross section of said inlet conduit, one face of said baffle being maintained substantially parallel to and spaced apart from said cyclone separator inlet conduit, the other face of said baffle being spaced apart from the closed end of said shell conduit, a solids collecting chamber formed within said shell conduit between the other face of said baffle and said closed end of said shell conduit, a funnel-shaped transition piece extending at a right angle and continuous with the said solids collecting chamber and a dipleg extending at a right angle to said shell conduit and continuous with said transition piece, whereby solids pass from said collecting chamber through said transition piece and then through said dipleg.

4. In a cyclone separating device including a plurality of cyclone separators arranged in series and including a primary cyclone separator and a last cyclone separator, said primary cyclone separator being provided with an extended inlet conduit, the improvement which includes a de-entrainment device which comprises a hollow shell conduit having a closed end and an open end, said hollow shell conduit being of a larger internal cross sectional area than the external cross sectional area of said extended inlet conduit and arranged in spaced apart and parallel relation from said extended cyclone separator inlet conduit, said cyclone separator inlet conduit extending into said shell conduit and terminating adjacent to and in close proximity to said closed end of said shell conduit, said inlet conduit being arranged substantially parallel to said shell conduit and spaced inwardly from the interior of said shell conduit to provide a continuous passageway between said inlet conduit and said shell conduit, a baffle in said hollow shell conduit of substantially the same area as the internal cross section of said inlet conduit and located external to said cyclone separator inlet conduit and between said cyclone separator inlet conduit and the closed end of said shell conduit, means to maintain said baffle substantially parallel to and in spaced apart relation from said inlet line conduit, a solids collecting chamber formed within said shell conduit between said baffle and said closed end of said shell conduit and means whereby solids from said collecting chamber are recovered.

5. An apparatus for separating entrained solids from a gaseous stream in which they are entrained which includes a hollow shell conduit having an open end and a closed end, said shell conduit being of a larger internal cross sectional area than the external cross sectional area of an extended cyclone separator inlet conduit, said inlet conduit having its external wall substantially parallel to and spaced apart a distance from the internal wall of said shell conduit to form a continuous inlet passageway surrounding the end portion of said inlet conduit and extending from the open end of said shell conduit to beyond the opening in said cyclone separator inlet conduit, a baffle of about the same area as the cross section of said inlet conduit and concentric therewith, said baffle being external to said inlet conduit and spaced apart from the open end of said inlet conduit, means to rigidly maintain said baffle in spaced parallel relation to the plane of the open end of said cyclone separator inlet conduit, a solids collecting chamber formed within said shell conduit between said baffle and the closed end of said shell conduit, and means for removing separated solids from said collecting chamber including a dipleg, said dipleg extending at a right angle to said shell conduit and being continuous with said collecting chamber.

6. An apparatus according to claim 5 wherein said cyclone separator extended inlet conduit is spaced at a distance of between 1¼ and 4¼ inches from the internal wall of said shell conduit and said baffle is spaced at a distance of between 1¼ and 4¼ inches from the end of said extended cyclone separator conduit.

7. An apparatus for separating solids from a gaseous stream passing through a vessel which includes in combination a vessel having a solids-gas inlet line, a solids outlet line and a gaseous outlet line, solids separating means in said vessel including a plurality of cyclone separators arranged in series and including a first cyclone separator and a last cyclone separator and wherein said first cyclone separator is provided with an extended inlet conduit and the last cyclone separator in said series is connected with said gaseous outlet line, a de-entrainment device including a hollow shell conduit having an open end and a closed end and of larger internal cross sectional area than said first cyclone separator extended inlet conduit and arranged in spaced apart parallel relation to said first cyclone separator extended inlet conduit, said extended separator inlet conduit being arranged horizontally and substantially parallel to and in spaced apart relation with the inner wall of said shell conduit to provide a continuous horizontally arranged passageway therebetween, a vertically arranged baffle in said hollow shell conduit, said baffle being of substantially the same area as the cross sectional area of said extended inlet conduit, means for rigidly maintaining said baffle externally of said extended inlet conduit and substantially parallel to the plane of the end of said separator extended inlet conduit and in spaced apart relation thereto, a solids collecting chamber within said shell conduit between said baffle and the closed end of said shell conduit, and means whereby solids are returned from said collecting chamber to said vessel, the separated gaseous stream passing from said de-entrainment device through said plurality of serially arranged cyclone separators and separated gas being vented through said gaseous outlet line from said last cyclone separator.

8. An apparatus according to claim 7 wherein said cyclone separator extended inlet conduit is spaced at a distance of between 1¼ and 4¼ inches from the internal wall of said shell conduit and said baffle is spaced at a distance of between 1¼ and 4¼ inches from the end of said extended cyclone separator conduit.

References Cited by the Examiner

UNITED STATES PATENTS

| | | | |
|---|---|---|---|
| 606,074 | 6/1898 | Oakley | 137—171 X |
| 755,430 | 3/1904 | Allington | 55—1 |
| 1,223,662 | 4/1917 | Bennett | 55—414 |
| 1,463,416 | 7/1923 | Adams | 55—441 X |
| 1,723,703 | 8/1929 | Monaghan | 55—426 |
| 1,818,905 | 8/1931 | McGee | 55—345 X |
| 1,925,373 | 9/1933 | Davies | 55—426 X |
| 2,001,184 | 5/1935 | Cuppy | 55—515 X |
| 2,010,231 | 8/1935 | Heist | 55—436 X |
| 2,069,483 | 2/1937 | Skajaa | 55—499 X |
| 2,327,691 | 8/1943 | Allardice | 55—426 X |
| 2,378,607 | 6/1945 | Watts | 55—343 X |
| 2,538,947 | 1/1951 | Adams | 55—441 X |
| 2,724,904 | 11/1955 | Gordon | 55—342 X |
| 2,812,828 | 11/1957 | Yellott et al. | 55—398 |
| 2,846,024 | 8/1958 | Bremi | 55—426 X |
| 2,886,419 | 5/1959 | Orr et al. | 55—345 X |

FOREIGN PATENTS

| | | |
|---|---|---|
| 349,936 | 6/1931 | Great Britain. |
| 488,787 | 1/1954 | Italy. |

HARRY B. THORNTON, *Primary Examiner.*

REUBEN FRIEDMAN, *Examiner.*